United States Patent [19]
de Mendez et al.

[11] 4,310,217
[45] Jan. 12, 1982

[54] ACTIVE COUPLER BETWEEN AN OPTICAL BUS LINE AND ONE OF THE SUBSCRIBERS AND BUS LINE COMPRISING SUCH ACTIVE COUPLERS

[75] Inventors: Ossona de Mendez, Montlhery; Jean J. Crosnier, Vanves, both of France

[73] Assignee: Souriau & Cie, Boulogne, France

[21] Appl. No.: 117,525

[22] Filed: Jan. 31, 1980

[30] Foreign Application Priority Data

Feb. 2, 1979 [FR] France ................. 79 02794

[51] Int. Cl.³ ............................................. H04B 9/00
[52] U.S. Cl. ................................. 350/96.16; 250/227; 250/552; 455/612
[58] Field of Search ............... 350/96.15, 96.16, 96.17, 350/96.18, 96.20, 96.21; 250/227, 552; 370/1; 455/606, 610, 612

[56] References Cited

U.S. PATENT DOCUMENTS

| | | | |
|---|---|---|---|
| 3,870,396 | 3/1975 | Racki et al. | 350/96.16 |
| 3,931,512 | 1/1976 | Kent et al. | 250/227 X |
| 3,937,560 | 2/1976 | Milton | 350/96.16 |
| 3,977,764 | 8/1976 | d'Auria et al. | 350/96.16 |
| 3,996,526 | 12/1976 | d'Auria et al. | 350/96.20 X |
| 4,130,345 | 12/1978 | Doellner | 350/96.15 X |
| 4,136,929 | 1/1979 | Suzaki | 350/96.15 |
| 4,149,770 | 4/1979 | Milton et al. | 350/96.15 |
| 4,165,496 | 8/1979 | Di Domenico, Jr. et al. | 350/96.15 X |
| 4,176,908 | 12/1979 | Wagner | 350/96.15 |
| 4,191,446 | 3/1980 | Arditty et al. | 350/96.15 |
| 4,217,598 | 8/1980 | d'Auria et al. | 250/227 X |

FOREIGN PATENT DOCUMENTS 1543035  3/1979 United Kingdom ............ 350/96.15

OTHER PUBLICATIONS

"Simple Coupler Taps Fiber-Optic Cables", *Electronics*, Dec. 20, 1973, pp. 30-31.

*Primary Examiner*—John D. Lee
*Attorney, Agent, or Firm*—McAulay, Fields, Fisher, Goldstein & Nissen

[57] ABSTRACT

An active optical coupler between an optical bus line and subscribers. The optical coupler couples an emitting optical conductor and a receiving optical conductor and includes a diversion device that allows passage of a fraction of the incident light transmitted to the receiving conductor while diverting another fraction of this incident light energy to a photoreceiver which controls the injection of light energy into the optical coupler with a control in the form of a photoemitter for controlling the light energy transmitted to the receiving conductor with restoration of the level. A switch controls the operation of the photoemitter which in turn can be controlled either by the photoreceiver or by an input signal emitted by the subscriber. Digital data can be transmitted to subscribers by means of an optical bus line.

10 Claims, 6 Drawing Figures

ACTIVE COUPLER BETWEEN AN OPTICAL BUS LINE AND ONE OF THE SUBSCRIBERS AND BUS LINE COMPRISING SUCH ACTIVE COUPLERS

BACKGROUND OF THE INVENTION

1. Field of the Invention

The invention relates to an active coupler between an optical bus line and subscribers, and more particularly its subject is a coupler of this type for an optical bus line, transmitting data in digital form, as well as a bus line equipped with such active couplers.

The term optical bus line isssued to designate a line for transmission of data by optical conductors, serving a certain number of subscribers in parallel by means of couplers, thanks to which each of the subscribers is able both to receive data from a source or from other subscribers, and to transmit toward this source or toward other subscribers. In the case of a monodirectional coupler, a subscriber can receive data only from the source or from subscribers upline, situated between the source and himself on the bus line, and can transmit only to downline subscribers, while in the case of the two-directional coupler, each subscriber can receive data from any other subscriber, and can transmit for his own purpose, whatever his position on the bus line is. The optical conductors used to constitute the line can be monofilament or multifilament conductors.

2. Description of the Prior Art

Optical bus lines are already known, on which, at the level of each subscriber, an optical coupler insures the coupling of an optical transmitting conductor with an optical receiving conductor, that receives a transmitted fraction of the incident light energy transmitted by the transmitting conductor, the optical coupler being equipped with a device for diverting a fraction of the incident light energy, in order to insure the reception by the subscriber of an output signal constituted by, or proportional to this diverted fraction. The diversion device is constituted, for example, by a semireflecting plate allowing a fraction of the light energy, transmitted from the transmitting conductor to pass the receiving conductor, and insuring, by reflection, the diversion of a fraction of the incident light energy. When the subscriber transmits a signal, the latter can be injected, in the form of light energy, into one of the optical conductors, and will thus be transmitted to the other subscribers. Reverting to the preceding example, an input light signal can be injected into the optical receiving conductor by the semireflecting plate. These known optical bus lines have the drawback that the diversion of a fraction of the incident energy at the level of each coupler, makes for a loss of power of the optical signal circulating in the line. Since the insertion losses of an optical coupler are, for example, on the order of 3 decibels (db), it will be easy to imagine the difficulties arising on the reception at the level of the tenth consecutive subscriber on the line, which will receive the data at a level 30 db lower than that at which the first subscriber receives the data.

To relieve this drawback, there have already been proposals to equip the bus line at the level of each subscriber with a repeater interrupting the optical path, and constituted by a photoreceiver situated at the end of the upline optical conductor, and emitting an output signal intended for the subscriber, this signal, at the same time, being correctly amplified, then sent to the terminals of a phototransmitter which reinjects into the downline optical conductor, a light signal whose level has been restored, without occasioning a loss of power at the level of the subscriber. But these bus lines with repeaters have another drawback, which is that any transmission is made impossible in the event of a breakdown of a single repeater.

SUMMARY OF THE INVENTION

By the present invention, it is proposed to remedy these drawbacks by means of an active coupler comprising an optical coupler equipped with a semireflecting plate, traversed by a fraction, tramsmitted to the downline optical conductor, of the incident light energy transported by the upline optical conductor, the face of the plate turned toward the upline optical conductor diverting, by reflection, another fraction of the incident light energy, to insure the reception by the subscriber of an output signal, the face of the plate turned toward the downline optical conductor being able to insure the injection into the latter of a light energy corresponding to an input signal transmitted by the subscriber, and is characterized in that the diverted fraction of the incident light energy is received by a photoreceiver device controlling the reinjection, into the optical coupler, by means of a phototransmitter device, of a light energy transmitted to the downline optical conductor, by reflection on the face of the plate turned toward the latter, and adding itself to the fraction of incident light energy transmitted, so that the level of the light energy received by the downline optical conductor will be suitably restored with neither demodulation nor other processing of the transmitted fraction of the incident light energy.

Advantageously, this is obtained by means of a switching device controlling the operation of the photoemitter device, and controlled in turn either by photoreceiver device or by the input signal transmitted by the subscriber.

In a preferred form of embodiment, the photoreceiver device is constituted by a photodiode whose terminals are connected to the two input terminals of a preamplifier, the output terminal of which is connected to the switching device, while the photoemitter device is constituted by an electroluminescent diode whose input terminal is connected to a power supply and whose output terminal is connected to the switching device which, in turn, is constituted by a threshold-type amplifier, the input terminal of which is connected to the output terminal of the preamplifier, and is also capable of receiving the input signal transmitted by the subscriber, and whose output terminal is connected to the base of a transistor, connected by its collector to the output terminal of the photoemitter device, so that an output signal toward the subscriber, whose level is independent of the level of the incident light energy, will be available at the emitter of the transistor, which is conductive, when its base receives a stage (echelon) signal issued by the amplifier, as soon as the signal received by the latter is above the threshold. And finally, the face of the plate turned toward the upline optical conductor is selectively metallized, to mask the photoemitter device to the photoreceiver device, so that the active coupler cannot be locked in a configuration of reinjection of light energy into the downline optical conductor, as soon as a fraction of incident light energy has been received by the photoreceiver device.

But the active coupler can also comprise a second semireflecting plate similar to the first, and associated with a second photoreceiver device and a second photoemitter device, so that the active coupler will be two-directional, the two optical conductors being able to alternate, one as the upline conductor and the other as the downline conductor.

But, in a preferred form of embodiment, of a two-directional active coupler, the optical coupler will comprise a diversion device embodied in the form of a crossed optical system, constituted by a second semireflecting plate similar to the first, and crossed with the latter, so that each of the two plates will be able, on the one hand, to reflect, toward the photoreceiver device, the diverted fraction of the incident light energy transmitted by one of the optical conductors, and on the other hand, to be traversed by the fraction of the incident light energy transmitted directly to the other optical conductor, and, finally, to insure the injection, into this other optical conductor, of the light energy emitted by the photoemitter.

The present invention will be better understood with the aid of particular examples of embodiment which will be described below, in a non-limiting fashion, with reference to the attached figures in which:

Figure 1:
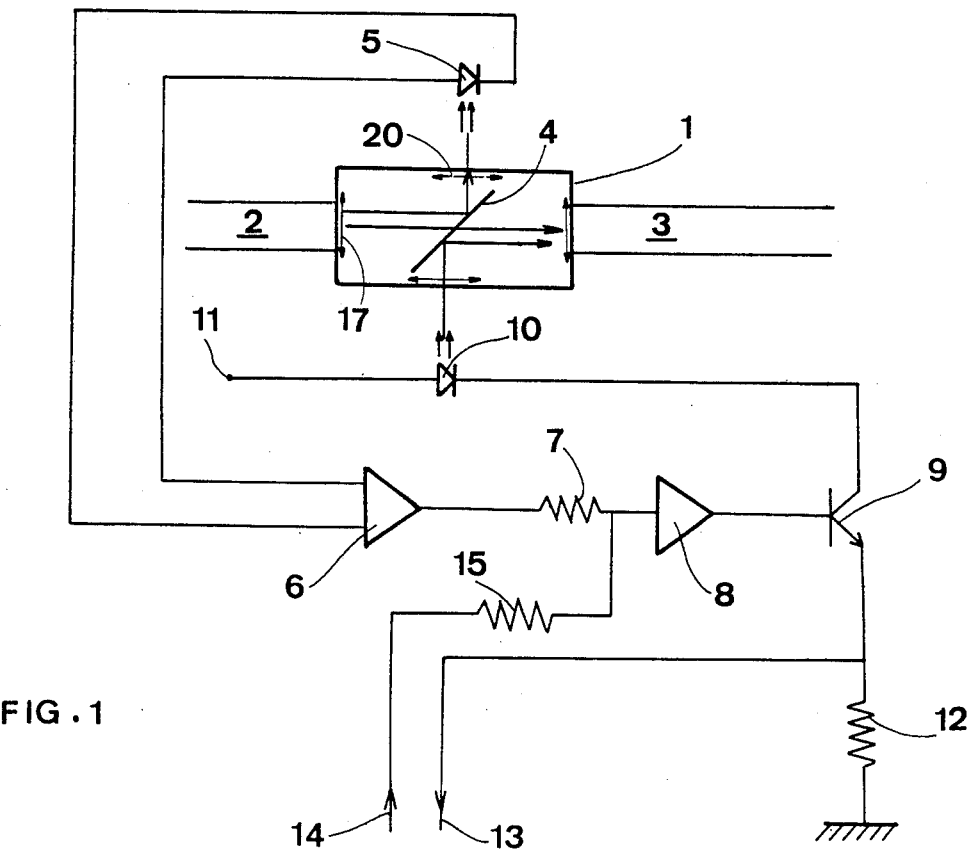
FIG. 1 represents, in schematic fashion, a monodirectional active coupler according to the invention.
Figure 4:
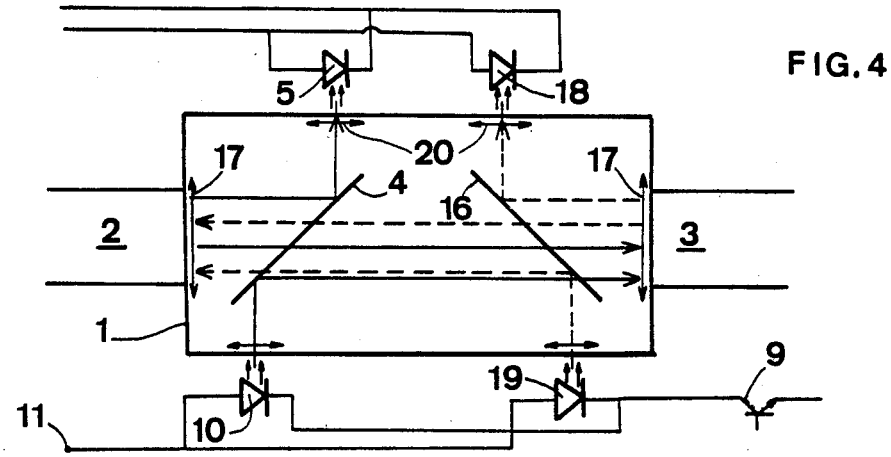
Figure 5:
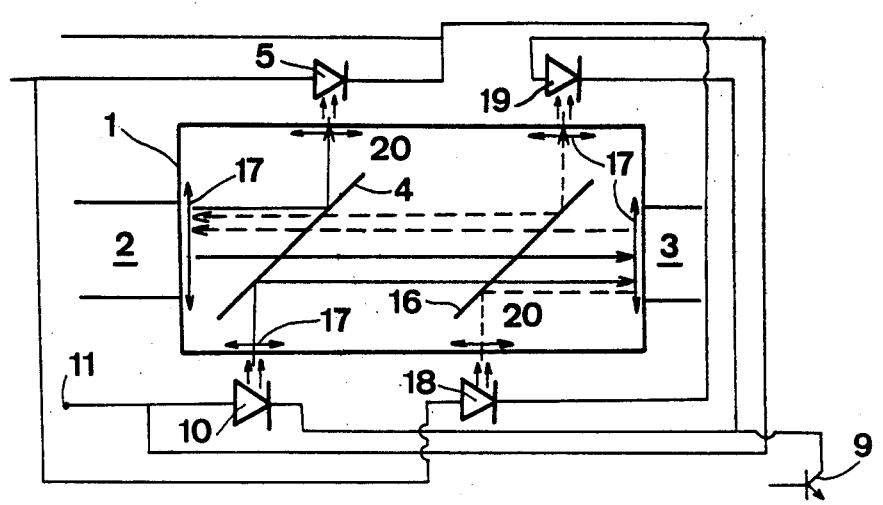
Figure 6:
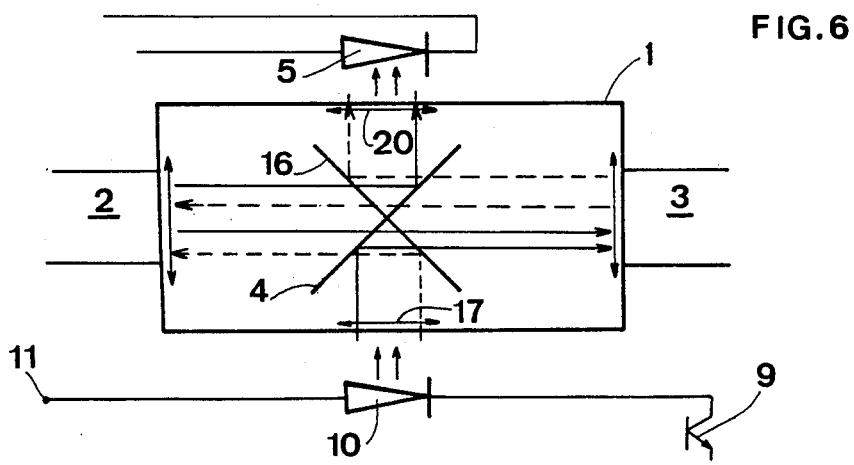

And, FIGS. 4, 5 and 6 represent, partially and schematically, three means of an embodiment of two-directional active couplers according to the invention, the representations being limited to the optical couplers and to the components adjacent to them, and the components not represented being identical to the corresponding components in FIG. 1.

DESCRIPTION OF THE PREFERRED EMBODIMENTS

Referring to FIG. 1, monodirectional active coupler comprises an optical coupler 1 interposed between an upline optical conductor 2 and a downline optical conductor 3 of an optical bus line. Optical coupler 1 is equipped with a diversion device constituted by a semireflecting plate 4, traversed by a fraction of the light emitted by the upline optical conductor 2, which is thus directly transmitted to the downline optical conductor 3, and insuring, by reflection, the diversion of another fraction of the light emitted, to a photodiode 5, for example of the P.I.N. type.

Assuming that the power of the incident light signal emitted by the upline conductor 2 is equal to unity, the power of the signal transmitted to the receiving conductor 3 has a value x lower than 1, and the power reflected on photodiode 5 is $1-x$, disregarding the losses by absorption in the optical coupler. Thus, at the terminals of photodiode 5 there is an electric signal "e" proportional to $1-x$, which is amplified by a preamplifier 6, whose two input terminals are connected to the terminals of photodiode 5, if the electric signal processed by photodiode 5 is a level falling within the dynamic range of preamplifier 6. If Y is the lower limit of the dynamic range of preamplifier 6, the signal "e", processed by photodiode 5 will be amplified to "E" by preamplifier 6, provided that "e" is higher than Y. The amplified electric signal E available at the output terminal of preamplifier 6 is then transmitted, through a resistor 7, to the input terminal of a threshold amplifier 8 acting as a comparator, which emits an output stage signal if its input signal is higher than the threshold, and emits no output signal if its input signal is lower than the threshold. The output terminal of amplifier 8 is connected to the control electrode of a transistor 9, working as a switch; this transistor 9 can be of the dipole, or field-effect type. For the remainder of the description it will be considered that a dipole transistor is involved, the transposition in the case of a field-effect transistor being made in a manner well known in itself. Dipole transistor 9 is thus connected by its base to amplifier 8, and by its collector to the output terminal of a rapid electroluminescent diode 10, fed by its input terminal connected to a source of electric power 11 at a positive potential, while the emitter of transistor 9 is grounded through a resistor 12. Transistor 9 works in saturation and is blocked when its base receives a stage signal from amplifier 8. In this configuration, transistor 9 is conductive, and electroluminescent diode 10 is traversed by an electric current whose intensity depends on the feed voltage available at 11, the light emitted by electroluminescent diode 10 being injected into optical coupler 1, where the semireflecting plate reflects it toward downline optical conductor 3, while, at the emitter of transistor 9 an output signal is available, intended for the subscriber, to whom this signal is transmitted by electric line 13. By means of line 14, the subscriber can also send an input signal to the input terminal of amplifier 8, through a resistor 15, in order to make transistor 9 conductive and to inject, into downline optical conductor 3, a light signal emitted by electroluminescent diode 10. Amplifier 8 and transistor 9 thus constitute a switch, controlled either by photodiode 5, to open or close the light emission of electroluminescent diode 10 toward downline optical conductor 3, in order to restore the level of the light signal transmitted by this conductor toward the other subscribers downline, and in order to transmit to the subscriber a signal of constant level independent of the level of the light signal emitted by the upline optical conductor 2, or by the electric input signal transmitted by the subscriber through line 14, to inject into downline optical conductor 3, a light signal intended for the other subscribers and of constant level. As a matter of fact, if the electric signal e corresponding to the diverted fraction $(1-x)$ of the incident light energy, and processed by photodiode 5, is higher than Y, the lower limit of the dynamic range of preamplifier 6, amplifier 8 will send a stage signal to the base of transistor 9 and make the latter conductive. Line 13 is then brought to a constant potential, independent of the diverted fraction $(1-x)$ of the incident light signal, and depending only on the feed voltage at 11 and the internal resistances of diode 10 and transistor 9, just as the light signal injected by electroluminescent diode 10 into optical coupler 1, and reflected by semireflecting plate 4 into downline conductor 3, is of a level Z independent of the diverted fraction $(1-x)$. In the downline optical conductor, the injected light signal, of level Z, is added to the transmitted fraction x of the incident light signal x, which procures a restoration of the level of the light signal carried toward the other subscribers.

It is advantageous to select the components 9 and 10, and the feed voltage at 11 in such a way that Z will be equal to $1-x$, so that the power of the light signal transmitted all along the bus line will be equal to unity, in the absence of a breakdown. If the active coupler of order $n-1$ on the bus line breaks down, that is to say if it does not procure a restoration of the level of the light signal transmitted, the incident light signal received by the optical coupler of order n is at level x. The fraction transmitted in the optical coupler of order n is $x_2$, while the fraction reflected is $x(1-x)$. If the electric order processed by photodiode 5 is higher than Y, there will be a reinjection of a light signal of level $Z=1-x$, so that the signal emitted by the optical conductor connecting the active coupler of order n to the active coupler of order $n+1$ will be of level $Z+x^2$, or $1-x+x^2$. On passing in the couplers of higher order, the level of the light signal carried will be restored asymptotically toward the level unity, according to the series $1-(1-x)x^p$, p being the order of the active coupler after the one which has broken down.

Likewise, if a subscriber sends an input signal on line 14 of his active coupler, there is an injection of a light signal of level $Z=1-x$ toward the next subscriber, whose optical coupler transmits a fraction $x(1-x)$, restored by injection of a fresh signal of level $1-x$, making a total of $x(1-x)+1-x=1-x^2$. After the coupler of order p following the subscriber that has emitted an input signal, the light signal carried by the bus line will have the level $1-x^{p+1}$, according to a series converging toward the value of unity.

In practice, if each coupler develops a total insertion loss of 3 db, which corresponds to $x=0.5$, and if the dynamic range of preamplifier 6 is slightly higher than 12 db, a value corresponding to the threshold of comparison of amplifier 8, the result is a bus line on which three successive active couplers can be broken down, without interrupting the transmission, and following which the light signal transmitted will be regenerated and restored.

It should be noted, however, that the probability of having three successive active couplers broken down is low.

Figure 2:
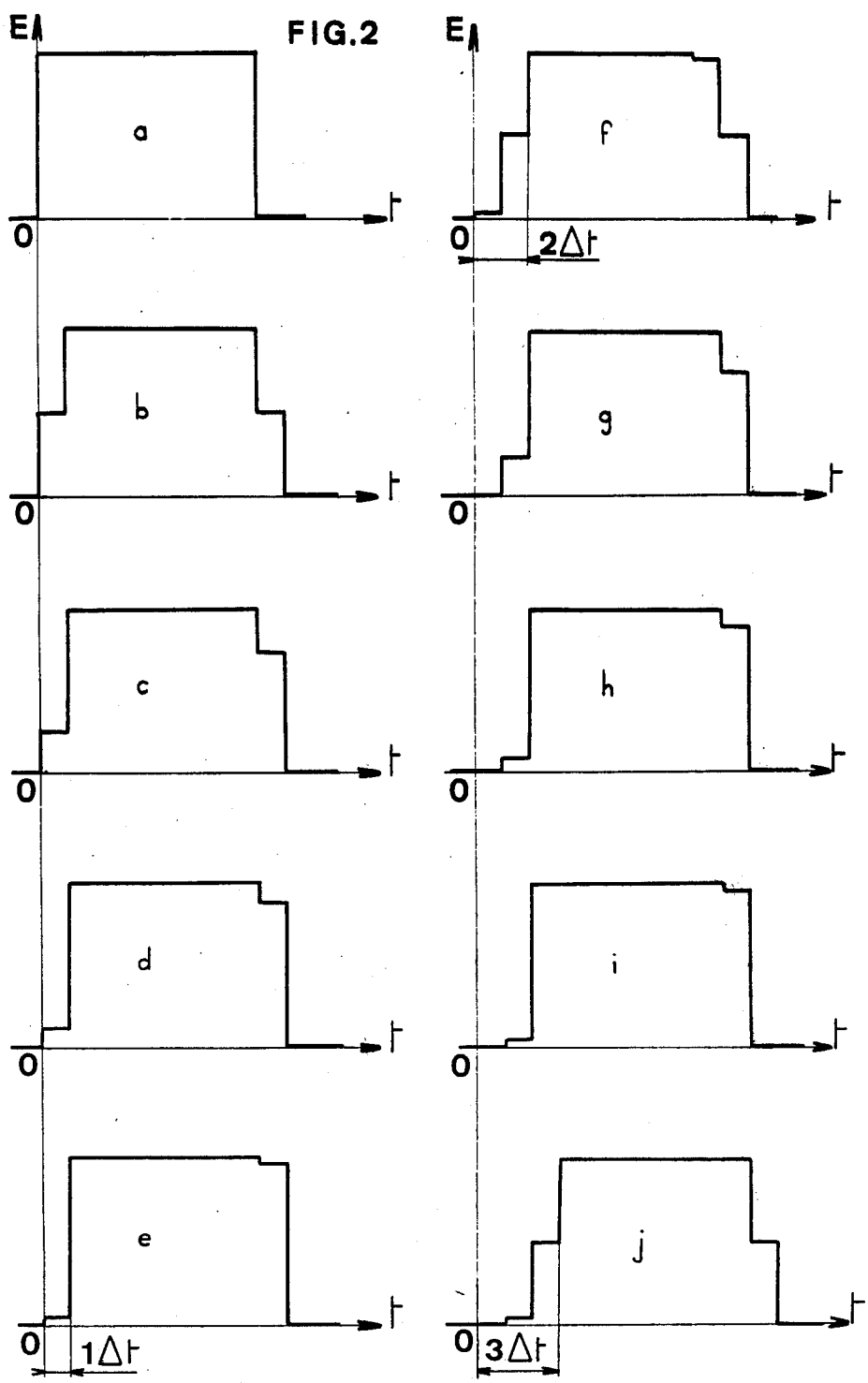
FIG. 2 represents a chronogram showing the evolution of an incident signal of the stage (echelon) type, through a succession of active couplers according to FIG. 1.

With regard to the expansion of an incident light signal, introduced, on passing through each active coupler, by the response time of the electronic chain containing photodiode 5, preamplifier 6, the switch constituted by amplifier 8 and transistor 9, as well as the electroluminescent diode 10, it appears that its influence is limited owing to the presence of a minimal threshold to be detected in order to trigger a reinjection by electroluminescent diode 10, since the choice of this threshold, as already mentioned elsewhere, fixes the possible number of successive, active couplers that are broken down, in view of the dynamic input range of preamplifier 6. FIG. 2 represents the evolution of an incident light signal, of the stage type, as it passes through successive active couplers, reverting to the case of a transmission ratio x of 0.5 which permits three successive couplers to be broken down, and for a minimum threshold to be detected which is slightly lower than $(0.5)^4$, or 0.0625. The evolution of the incident stage signal, which is represented in FIG. 2a, is given by FIGS. 2b, 2c, 2d, etc. representing, respectively, the signal at the output from the coupler of order 1, 2, 3, etc. For an incident signal of energy level E equal to unity, the reinjection of light energy by the couplers of order 1, 2, 3 and 4 is triggered by the signal diverted to the photodiode 5 of each of the couplers, and received, respectively, at levels of 0.5, 0.25, 0.125 and 0.0625, which are above the threshold. The triggering of the reinjection is therefore done on the initial incident signal, and the regenerated signals from couplers 1, 2, 3 and 4 are all offset by the same time $\Delta t$ relative to the initial incident signal, since the retards are not cumulative.

Starting with the 5th coupler, the triggering of the reinjection is done on the signal regenerated by the couplers of order 1, 2, 3 and 4, up to the 8th coupler, while the initial signal becomes negligible.

Figure 3:
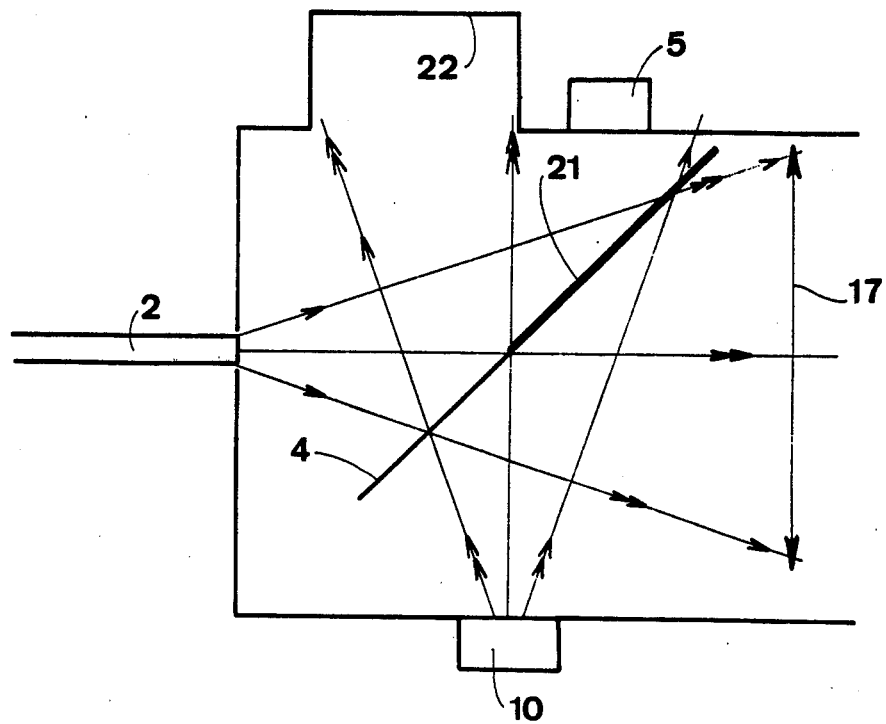
FIG. 3 represents, partially and schematically, an optical coupler for an active coupler according to FIG. 1, arranged to prevent any locking of the active coupler on itself.

It is found, as a matter of fact, that the expansion of a signal in the form of a pulse is fixed by the response time $\Delta t$ of a single coupler, and that this pulse is offset in time by a jump of $\Delta t$ every 4 couplers in the example considered. This offset, comparable to a transit time, is not prejudicial to the quality of the transmission. It is therefore possible to associate a large number of active couplers, while retaining good transmission over the bus line. As represented in FIG. 3, in order that photodiode 5 will not be blinded by the light emitted by electroluminescent diode 10, which would lock the system, by looping it onto itself, the face of part 21 of plate 4 turned toward the upline optical conductor 2, is metallized, so that the face of this part 21 turned toward the downline optical conductor 3 is fully reflecting for the fraction it receives of the light emitted by electroluminescent diode 10, the fraction of light emitted by the latter and traversing the other, non-metallized, part of plate 4 being absorbed in a cavity 22, blackened on the inside, formed in the body of the optical coupler which, in FIG. 3 is shown equipped with a lens 17 in a central position, the various beams of light, emitted both by the upline optical conductor 2 and by electroluminescent diode 10, and reflected or transmitted by semireflecting plate 4, being divergent, while in FIG. 1, coupler 1 is traversed by parallel beams, since the lenses 17 are disposed at the optical entries and outlets of coupler 1.

FIGS. 4, 5 and 6 show three different means of embodiment of optical couplers 1 associated with the components such as photodiodes 5 and electroluminescent diodes 10 which are adjacent to them in two-directional active couplers according to the invention, the components not shown being identical to the corresponding components shown in FIG. 1.

In such two-directional active couplers, the optical couplers insure the connection between two optical conductors 2 and 3 which can be alternately the upline conductor and the downline conductor. For the sake of clarity of the schematic representation, the optical paths in optical couplers 1 have been made exaggeratedly eccentric.

The diversion device of the optical coupler 1 in FIG. 4 is constituted by two semireflecting plates 4 and 16, which are identical and selectively metallized, capable of receiving, respectively, from optical conductors 2 and 3, a light beam made parallel by means of lenses 17 disposed at the junction between optical coupler 1 and each of the conductors 2 and 3. Plates 4 and 16 are inclined toward one another in such a way that the first may reflect a fraction of the incident light emitted by conductor 2 towards photodiode 5, transmit to conductor 3 another fraction of this incident light, and finally, inject, by reflection into conductor 3, a light signal of restoration issuing from electroluminescent diode 10, when, as explained above, the electric signal available at the terminals of photodiode 5 will, after amplification, have controlled the commutation of the switch constituted by amplifier 8 and transistor 9. In symmetrical fashion, plate 16 can reflect, toward a photodiode 18 identical to 5 and mounted in parallel with the latter, a fraction diverted from the incident beam emitted by conductor 3, transmit directly to conductor 2 another fraction of the incident beam, and finally reinject, by reflection, into conductor 2, a light signal of restoration emitted by an electroluminescent diode 19, identical to 10 and mounted in parallel with the latter between feed terminal 11 and the collector of transistor 9.

Other lenses 20 will advantageously be provided to focus, onto photodiodes 5 and 18, the light energy reflected by plates 4 and 16.

The device represented in FIG. 5 differs from the one described above only by the fact that the two semireflecting plates 4 and 16 are parallel, which leads to a reversal of the positions of photodiode 18 and electroluminescent diode 19 relative to optical coupler 1, the operation remaining identical.

In a preferred form of the embodiment of a two-dimensional active coupler, the optical coupler 1 is, as shown in FIG. 6, equipped with a crossed optical system, constituted by two semi-reflecting plates 4 and 16, each capable of reflecting a fraction diverted from the incident light beam toward a single photodiode 5, depending on whether the emitting optical conductor is 2 or 3, both of them transmitting another fraction of the incident beam toward the receiving conductor, and both being capable of injecting, into the receiving conductor, a beam of level restoration emitted by a single electroluminescent diode 10.

The exterior aspect of an active coupler according to the invention, equipping a bus line constituted by monofilament or multifilament optical conductors, will be that of a housing united by two opposing faces to the two coupled optical conductors, and equipped on another one of its faces with an electrical connector receiving a multi-wire electrical conductor to insure the feed to amplifiers 8, preamplifier 7 and terminal 11 to form a ground, and to permit the input and output of the signals for the subscriber.

Another object of the invention is an optical bus line comprising active couplers according to the description above, in as large a number as desired, and permitting, in the event of the breakdown of one or more couplers, to continue to insure the service of the other subscribers.

We claim:

1. An optical amplifier comprising:
    input means for delivering a first optical light beam;
    partially reflecting and transmitting plate means including first and second reflecting surfaces, said first reflecting surface having a first input surface for receiving thereon the first light beam and for delivering a reflected light beam fraction and a transmitted light beam fraction of the first light beam;
    photoreceiver means having an input for receiving the reflected light beam fraction and having an output for generating a first electrical signal which is a function of the light quantity received at said input;
    electrical amplifier means having an input connected to the output of said photoreceiver means and having an output for delivering a second electrical signal which is an amplified signal of the first electrical signal and a function of the value of the first electrical signal;
    photoemitter means having an input connected to the output of said electrical amplifier means for delivering a second optical light beam which is a function of said second electrical signal, and
    the second optical light beam emitted being received on said second reflecting surface of said plate means and reflected therefrom, said second optical light beam being added to said transmitted light beam fraction for producing a third optical light beam; and
    output means responsive to said second optical light beam and said transmitted light beam fraction for delivering said third optical light beam.

2. The optical amplifier as claimed in claim 1, wherein
    said input means is an upline optical conductor and said output means is a downline optical conductor, and
    said partially reflecting and transmitting plate means being a semireflecting plate,
    said plate being traversed by said transmitted light beam fraction of the first optical light beam emitted by said upline optical conductor and transmitted to said downline optical conductor, the face of said plate being turned toward said upline optical conductor to reflectively divert said reflected light beam fraction of the incident first optical light beam onto said plate to insure the reception by a subscriber of an output signal, and the face of said plate being turned toward said downline optical conductor to insure the injection thereinto of a light energy corresponding to an input transmitted by the subscriber,
    said photoemitter means controlling the reinjection into said downline optical conductor of the reflected light beam fraction transmitted to said downline optical conductor by reflection on the face of the plate turned toward said downline optical conductor and adding itself to the transmitted fraction of the first optical light beam, so that the level of the light energy received by said downline optical conductor will be suitably restored.

3. The optical amplifier according to claim 2, wherein the face of said plate turned toward said upline optical conductor is selectively metallized to mask said photoemitter means from said photoreceiver means.

4. The optical amplifier according to claim 2, comprising
    a second semireflecting plate similar to said first-mentioned semireflecting plate, second photoreceiver means and second photoemitter means associated with said second semireflecting plate so that an optical bus line to which the optical amplifier is connected will be two directional whereby the upline optical conductor and the downline optical conductor are alternately a single optical conductor.

5. The optical amplifier according to claim 2, including
    a diversion device embodied in the form of a crossed optical system,
    said diversion device including a second semireflecting plate similar to said first semireflecting plate and crossed therewith so that each of said first and second plates on the one hand reflect the reflected light beam fraction diverted from incident light energy of said first optical light beam emitted by one of said optical conductors towards said photoreceiver means, and on the other hand, said photoreceiver means being traversed by the fraction of the incident light energy directly transmitted to the other of said optical conductors and finally, to insure the injection of the light energy emitted by said photoemitter into said other optical conductor.

6. The optical amplifier according to claim 1 or 2, including
- a switching device controlling the operation of said photoemitter means, said switching device being responsive to and controlled by said photoreceiver means or by an input signal transmitted by a subscriber coupled to an optical bus line.

7. The optical amplifier according to claim 6, wherein said photoemitter means includes an electroluminescent diode whose input terminal is connected to a power supply and whose output terminal is connected to said switching device.

8. The optical amplifier according to claim 6, wherein said electrical amplifier means includes a preamplifier having an output terminal connected to said switching device, and
said photoreceiver means includes a photodiode having terminals connected to the two input terminals of said preamplifier.

9. The optical amplifier according to claim 8, wherein said switching device is a threshold-type amplifier whose input terminal is connected to the output terminal of said preamplifier and is responsive to the input signal transmitted by the subscriber, and
a transistor having its base connected to the output terminal of said threshold amplifier, its collector connected to the output terminal of said photoemitter means, so that an output signal toward the subscriber whose level is independent of the level of the incident light energy will be available from the emitter of said transistor, which is conductive when its base receives a stage (echelon) signal delivered by said threshold amplifier as soon as the signal received thereby is higher than the threshold.

10. An optical bus line comprising a plurality of optical amplifiers according to claim 1 or 2, each of which cooperates with the other.

* * * * *